United States Patent
Gutmann

[15] 3,636,702
[45] Jan. 25, 1972

[54] SLACK BELT ROTATION SENSOR

[72] Inventor: Fredrick T. Gutmann, Caldwell, N.J.

[73] Assignee: Lockheed Aircraft Corporation, Burbank, Calif.

[22] Filed: Feb. 4, 1970

[21] Appl. No.: 8,516

[52] U.S. Cl. ................................58/145 R, 235/58 P, 346/43
[51] Int. Cl. ..................G04b 5/20, G01d 9/00, G06c 23/02
[58] Field of Search..................235/58 P, 58 CF, 91 D, 94 R; 58/145, 146; 346/43; 33/132, 134, 142; 74/242.8, 242.9; 192/11

[56] References Cited

UNITED STATES PATENTS

| | | | |
|---|---|---|---|
| 1,025,061 | 4/1912 | Hodgen | 74/242.9 X |
| 2,604,940 | 7/1952 | Heptinstall | 58/146 |
| 3,121,531 | 2/1964 | Bumpus, Jr. et al. | 235/58 P |
| 3,319,256 | 5/1967 | Valerio | 346/43 |

Primary Examiner—Stephen J. Tomsky
Attorney—Billy G. Corber and George C. Sullivan

[57] ABSTRACT

A shaft rotation sensing device wherein an idler shaft is coupled to an input shaft through a flexible belt. Friction bearing means provide a low level of resistance rotation of the idler shaft for maintaining one segment of the belt taut under constant speed conditions while a flywheel coupled to the idler shaft through a lost motion connection responds to shaft acceleration for tensioning the belt segment and shaft deceleration for slackening the belt segment. Lateral displacement of belt is detected for sensing shaft rotation. Combined with a clockwork mechanism, the rotation sensor forms part of an antitheft device for computing registers.

4 Claims, 2 Drawing Figures

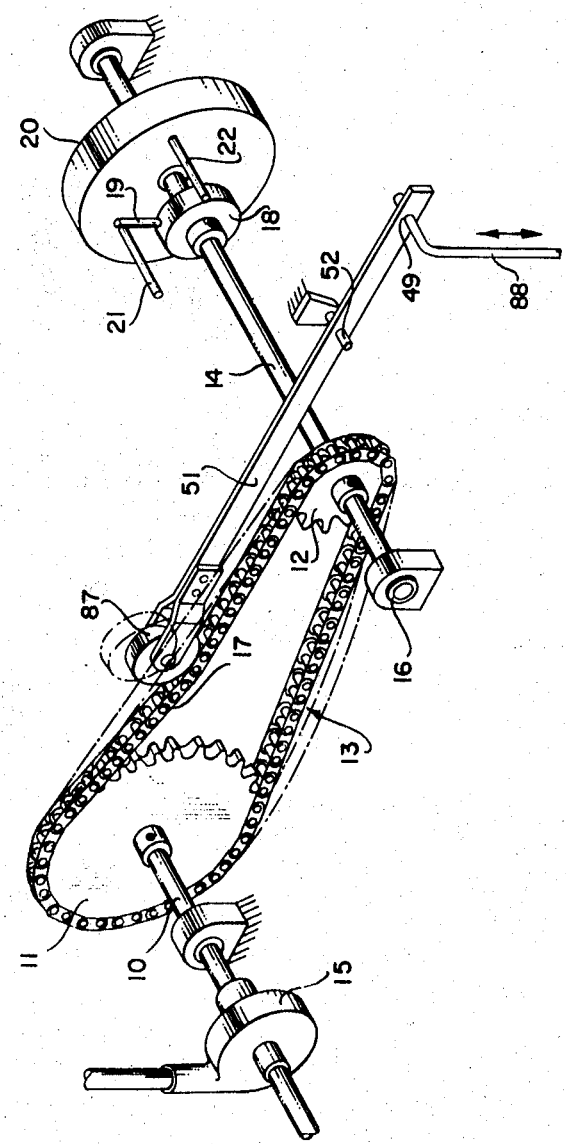
FIG_1

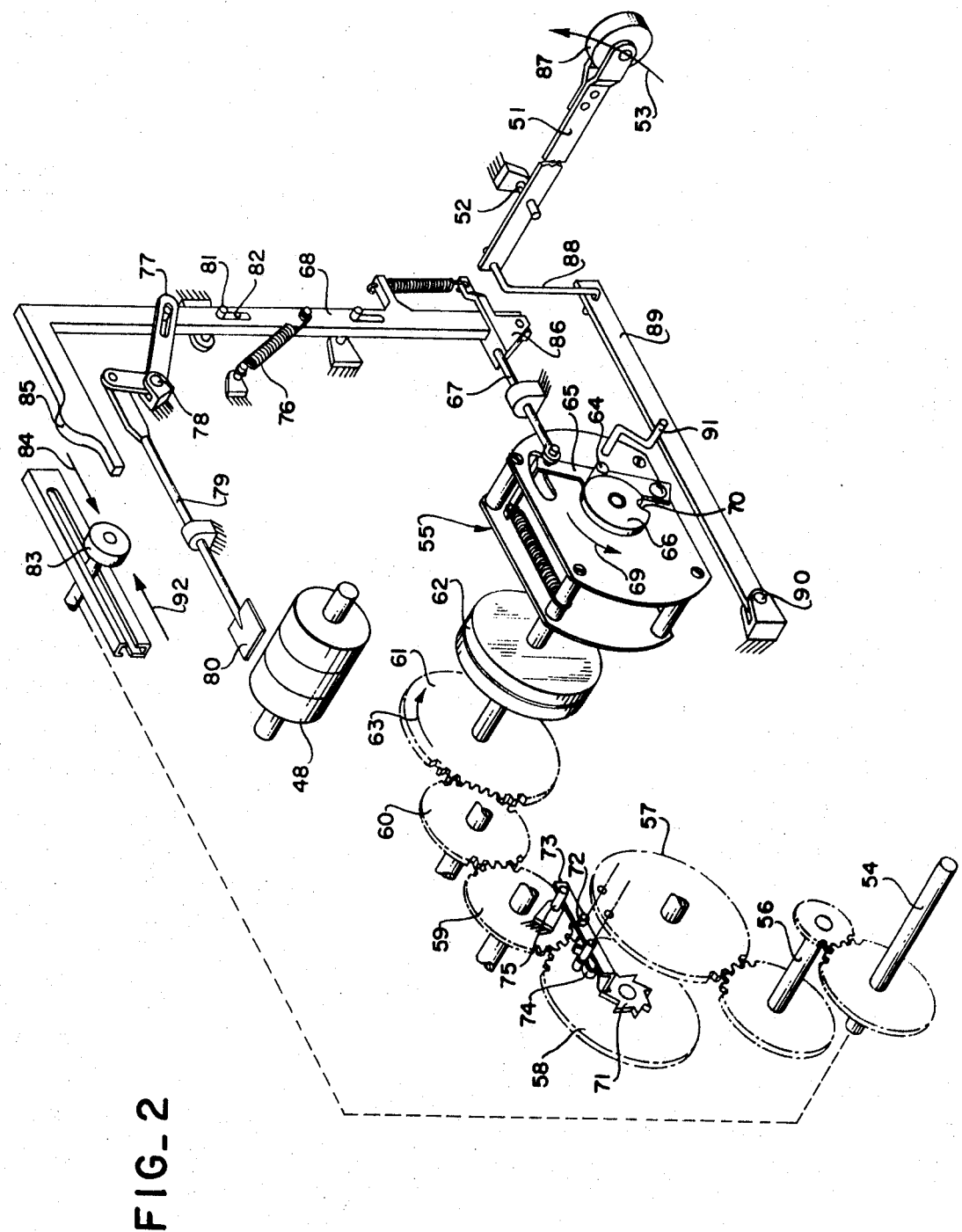

# 3,636,702

SLACK BELT ROTATION SENSOR

BACKGROUND OF THE INVENTION

This invention relates generally to rotation sensors and more particularly to antitheft devices for use with computing registers of the type disclosed in U.S. Pat. No. 3,121,531 to provide a sensory indication on a recording sheet when the alloted downtime of the register has been exceeded.

Computing registers of the type disclosed in U.S. Pat. No. 3,121,531 are commonly used in conjunction with a pump and a liquid meter as part of a liquid fuel delivery system on tank trucks and the like. In such applications, the computing register functions to compute and to print out on a recording sheet information such as quantity, unit price, total tax, total sales price, including tax and/or discount where applicable for accounting and customer billing purposes. Before starting the delivery, the driver inserts a ticket into the computing register. He then rotates a control knob which causes the computing register to performs several functions: capture the ticket so that it cannot be withdrawn until the transaction is complete, reset the print and display wheels to zero, print zeros in the gallon and money columns of the delivery ticket, and reposition the ticket for printout of delivery data. After this initialization, delivery can start. At completion of delivery, the driver rotates the computing register control knob again and this action causes the register to imprint on the ticket the number of gallons delivered and the price, returns the ticket to its original position in the register, and then releases the ticket.

With such a computing register, it is possible for the operator to insert the ticket, start a delivery to an unauthorized receiver, shut off the pump, leave the ticket in the register, and then proceed to a legitimate customer. There he can resume delivery and the customer will receive a ticket which shows an amount larger than that delivered to him. This practice is sometimes referred to as "riding the ticket."

SUMMARY OF THE INVENTION

An object of this invention is to prevent this type of cheating by providing an antitheft device which will operate to indicate on the ticket if a delivery has been interrupted for a period exceeding a predetermined amount of time—say 10 minutes, for example.

Another object of this invention is to provide a mechanical rotation sensor for detecting both shaft acceleration and shaft deceleration.

The antitheft device includes a clockwork which is wound by rotating the control knob of the computing register via suitable gearing. An interposer is associated with the clock in such a manner that it will be withdrawn when the predetermined period has elapsed whereby the final printout operation will indicate on the ticket that the prescribed delivery period has been exceeded.

The purpose of the rotation sensor is to stop the clockwork while actual delivery takes place. In the computing register there is an input shaft directly connected to the pump driven meter. Coupled to this input shaft either directly or by suitable gearing is a sprocket on a horizontal shaft which drives a flexible belt, such as a slack ladder or roller chain. Keyed to the driven sprocket is an idler shaft and a drive hub. A flywheel is rotatably mounted on the idler shaft and coupled to the drive hub through a lost motion mechanism, allowing limited rotation of the flywheel relative to the drive hub. A follower wheel attached to a pivoted follower arm rides on top of the flexible belt intermediate the driving and driven sprockets. The follower arm is so designed that it stops the clockwork when it is in the up position—that is, when the upper portion or segment of the flexible belt is taut.

Rotation of the input shaft for the flexible belt tends to tension the upper segment of the belt, and this is augmented by the limited lag of the flywheel. Thus, when the meter is running, the idler arm is up and stops the clock motion. When the meter stops, the drive sprocket stops, but the energy stored in the flywheel tends to keep the driven sprocket going, thereby slackening the upper segment of the belt. This drops the follower arm and allows the clock to run.

BRIEF DESCRIPTION OF THE DRAWING

FIG. 1 is an isometric view of the rotation sensor; and
FIG. 2 is an isometric view showing schematically the antitheft clockwork mechanism controlled by the rotation sensor.

Like numerals refer to like parts in these two figures of the drawing.

DESCRIPTION OF THE PREFERRED EMBODIMENT

Referring to FIG. 1, the rotation sensor includes a horizontal input shaft 10 which is coupled to and actuated by a pump-driven fluid meter 15. Driver sprocket wheel 11 is secured to shaft 10 and drives a second sprocket wheel 12 through a loosely draped flexible belt such as a slack ladder or roller chain belt 13. Preferably, the second or driven sprocket 12 is at least 50 percent smaller than the drive sprocket. Keyed to driven sprocket 12 is an idler shaft 14 supported for rotation in suitable friction bearings 16. Bearings 16 exert sufficient resistance of shaft 14 to rotation that the upper segment 17 of belt 13 will be maintained taut during periods of rotation of input shaft 10.

Secured to idler shaft 14 is a drive hub 18 having a pin 19 projecting radially outward therefrom. Adjacent hub 18 is a flywheel 20 rotatably supported on shaft 14. Two pins 21 and 22 project axially from the flywheel and are spaced apart sufficiently to cooperate with pin 19 on drive hub 18 and allow limited rotation of flywheel 20 relative to hub 18 and idler shaft 14. It has been found that approximately 90° relative rotation between the flywheel and hub is best for achieving minimum hunting and positive tensioning and slackening of the upper segment 17 of belt 13 on acceleration and deceleration, respectively, of input shaft 10 when operating at about 70 to 120 revolutions per minute. At other speed ranges, something other than 90° of lost motion may be desirable for the flywheel.

A follower wheel 87 attached to one end of an arm 51 rides on top of belt 13. As shown in the drawing, arm 51 is pivoted intermediate its ends at 52 to the machine frame. A link 88 connected to the free end 49 of arm 51 is lifted when the upper segment 17 of belt 13 goes slack and lowered when the belt is drawn taut. This link is employed in the antitheft system as a control lever for the timing mechanism as hereinafter described.

Referring to FIG. 2, shaft 54 is connected to the reset controls of a computing register, such as that shown and described in U.S. Pat. No. 3,121,531. Before delivery, the driver manually turns a control knob on the computing register which conditions the computer register and causes shaft 54 to rotate about 380° counterclockwise to initialize the antitheft mechanism.

Rotation of shaft 54 is transmitted to clockwork 55 via compound gear 56, split gears 57 and 58, idlers 59 and 60, input gear 61 and slip clutch 62. The winding of the clockwork takes place in direction 63. As the clockwork is wound, the detent 64 of pivoting lever 65 rides up on cam 66, urging the interposer 67 to the right, until it engages latch 68. The vertical motion of latch 68 will be described later.

A suitable clockwork is made by M. H. Rhodes, Inc. of Hartford, Conn. It is designated as Mark-Time 1900 series, one model of which rotates through 180° in 10 minutes. Cam 66 and lever 65 are part of this clockwork.

The clockwork has internal stops (not shown) which limit winding to no more than about 180° from the point where detent 64 drops into depression 70 of cam 66.

Once clockwork 55 is wound, it will tend to run backwards (counterclockwise) in direction 69 until detent 64 of pivoting lever 65 drops into depression 70 of cam 66. It will also drive gears 58 via slip clutch 62 and gears 61, 60 and 59. Gears 57 and 58 are interconnected by means of a one-way mechanism so that the clockwork is free to run down without having to rotate shaft 54. Fastened to gear 58 is ratchet wheel 71. Gear 57 carries a pivot 72 for pawl 73 which is urged into contact with the ratchet wheel by spring 74 which is also carried by gear 57. The gear train is so proportioned that for the 180° input rotation into the clockwork, gear 58 rotates about 300°. When the clockwork is fully wound, the tail of pawl 73 moves into pin 75 which is stationary in the machine frame. The pawl is now disengaged from the sprocket wheel, and gear 58 is free to turn clockwise. The computing register is so designed that before the next winding cycle, shaft 54 is rotated clockwise, moving pawl 73 away from stop pin 75. When gear 57 again rotates clockwise during the next winding cycle, pawl 73 will again engage ratchet wheel 71.

If the clockwise has run down only part of the way, a full winding cycle would overpower one of its internal stops. Overwinding is prevented by the slip clutch 62.

Consider now the conditions where the clockwork 55 has run down, and rotation of cam 66 has reached its end. Detent 64 has dropped into depression 70, and the interposer 67 has moved to the left. Now latch 68, urged by extension spring 76, moves upwards, and bell crank 77 rotates counterclockwise about pivot 78 which is fixed in the machine frame. This action moves lever arm 79 to the left, placing shutter 80 over print wheel 48. This is preferably a print wheel indicating price per gallon, so that this action does not obscure gallon or dollar printout. When the "amount delivered" is imprinted on the ticket, with only the price per gallon figures being altered by omission of a digit in a characteristic fashion, a delivery of excess downtime duration is clearly indicated. This type of sensory indication by omission of a digit is considered superior to one such as where the ticket is punctured, since the driver might in the latter case insert a shim to prevent puncture.

Latch 68 must be guided, as may be done by pins 81 fixed in the frame and riding in slots 82. Also, latch 68 must be reset before the next delivery cycle starts. This may be effected by a roller 83 fixed in and moving with the ticket carriage in directions 92 and 84. When the carriage, during initialization of the computing register, moves in direction 92, the roller 83 rides over cam surface 85, depressing latch 68. Detent 86 of the latch is suitably pivoted and spring loaded to ride over interposer 67 on the downstroke.

Roller 83 is kept out of contact with cam 85 on the output print cycle until the carriage returns in direction 84 sufficiently to prevent premature resetting latch 68.

Finally, reference is again made to the function of the rotation sensor in this system. While the meter runs, the upper segment of flexible belt 13 on which follower wheel 87 rides, is taut, and urges the follower 51 upwardly in direction 53. This action lowers link 88. Thus, arm 89 which pivots on pin 90 fixed in the frame, rotates clockwise, turning crank 91 counterclockwise. Inside the clockwork an extension of this crank (not shown) engages the escapement wheel and thus stops the clockwork. When the belt becomes slack, arm 51 drops, and the linkage consisting of link 88, arm 89 and crank 91 disengages itself, allowing the clockwork to resume running. If the downtime of the computing register exceeds the allowable time established by the clock, shutter 80 is moved over print wheel 48 by operation of the described linkage mechanism to obscure the printout and thereby provide an indication of the excessive downtime.

While the rotation is described herein in conjunction with an antitheft system for computing registers, it should be recognized that the device has utility beyond this specific use wherever changes in shaft rotation are to be monitored.

I claim:

1. A rotation sensor comprising, an idler shaft, a wheel secured to said idler shaft, a drive shaft, a flexible belt coupling said wheel to said drive shaft, the rotation of which is to be sensed, friction bearing means supporting said idler shaft, a flywheel generally coaxially aligned with said idler shaft and coupled thereto for limited relative angular rotation, said flywheel providing inertia forces normally exceeding the friction loads exerted by said bearing means, follower means engaging said flexible belt intermediate said wheel and said drive shaft for sensing lateral displacement of said belt, a timer mechanism responsive to said follower means for accumulating intervals of time in which said drive shaft is stationary, and arm means responsive to said timer mechanism for indicating completion of a predetermined accumulation of said intervals of time.

2. A device as defined in claim 1 wherein said timer mechanism is resettable.

3. A device as defined in claim 2 wherein said arm means is a mechanical link movable to provide a sensory indication that the predetermined accumulation of said intervals of time has been exceeded.

4. A device as defined in claim 3 including a shutter coupled to said mechanical link.

* * * * *